United States Patent
duPont

(10) Patent No.: US 6,857,597 B2
(45) Date of Patent: *Feb. 22, 2005

(54) CONTROL SYSTEM FOR VERTICAL TAKE OFF AND LAND (VTOL) AIRCRAFT

(76) Inventor: Anthony A. duPont, 1725 N. Marshall Ave., San Diego, CA (US) 92020

(*) Notice: Subject to any disclaimer, the term of this patent is extended or adjusted under 35 U.S.C. 154(b) by 0 days.

This patent is subject to a terminal disclaimer.

(21) Appl. No.: 10/717,213

(22) Filed: Nov. 18, 2003

(65) Prior Publication Data

US 2005/0006522 A1 Jan. 13, 2005

Related U.S. Application Data

(63) Continuation of application No. 10/074,710, filed on Feb. 13, 2002, now Pat. No. 6,648,268.

(51) Int. Cl.⁷ .............................................. B64C 29/00
(52) U.S. Cl. ...................................... 244/12.5; 244/237
(58) Field of Search .............................. 244/23 D, 237, 244/12.4, 12.5, 23 B, 12.3

(56) References Cited

U.S. PATENT DOCUMENTS

| | | | |
|---|---|---|---|
| 1,822,082 A | | 9/1931 | Davis |
| 2,712,420 A | | 7/1955 | Amster et al. |
| 2,762,584 A | * | 9/1956 | Price .................. 244/12.4 |
| 2,780,424 A | * | 2/1957 | Price .................. 244/12.4 |
| 2,835,456 A | * | 5/1958 | Kaplan .................. 244/7 C |
| 2,879,014 A | | 3/1959 | Smith et al. |
| 2,971,725 A | * | 2/1961 | Wsiewold .............. 244/63 |
| 2,974,900 A | * | 3/1961 | Morris et al. ........... 244/12.4 |
| 2,991,026 A | * | 7/1961 | Nelson et al. .......... 244/12.4 |
| 3,041,018 A | * | 6/1962 | Brooke-Smith ......... 244/234 |
| 3,100,377 A | | 8/1963 | Kosin et al. |
| 3,174,709 A | | 3/1965 | Alderson |
| 3,241,771 A | | 3/1966 | Erwin |
| 3,292,864 A | | 12/1966 | Edkins |
| 3,229,638 A | | 1/1967 | Santamaria et al. |
| 3,690,102 A | | 9/1972 | duPont |

(List continued on next page.)

FOREIGN PATENT DOCUMENTS

| | | |
|---|---|---|
| FR | 1254696 | 4/1960 |
| GB | 733931 | 7/1953 |

OTHER PUBLICATIONS

DuPont Aerospace Co. Inc., "Award/Contract", Effective Date: Jan. 22, 1998, pp. A–1–H–1.

(List continued on next page.)

Primary Examiner—Tien Dinh
(74) Attorney, Agent, or Firm—Paul, Hastings, Janofsky & Walker LLP

(57) ABSTRACT

A vertical take off and land (VTOL) jet aircraft may have a jet engine mounted in a forward portion of the aircraft. A thrust deflection assembly may be provided rearward of the jet engine, and include a cascade and control box for deflecting thrust during vertical flight of the aircraft. By manipulating the cascade and control box, the roll, yaw and pitch of the aircraft during vertical flight may be controlled. In addition, ailerons, a rudder and elevators may be provided for controlling roll, yaw and pitch during forward flight. A pilot control input apparatus is also provided, which receives pilot input regarding desired roll, yaw and pitch of the aircraft. The pilot control input is operatively associated with a control mixer, which controls the control box, ailerons, rudder and elevators in accordance with the desired roll, yaw and pitch of the aircraft. As a result, the pilot uses the same control input apparatus for vertical and forward flight.

19 Claims, 13 Drawing Sheets

U.S. PATENT DOCUMENTS

| | | | |
|---|---|---|---|
| 3,785,596 A | * | 1/1974 | Chinchester-Miles ....... 244/220 |
| 4,010,249 A | | 3/1977 | duPont |
| 4,045,546 A | | 8/1977 | duPont |
| 4,137,052 A | | 1/1979 | duPont et al. |
| 4,201,164 A | | 5/1980 | duPont |
| 4,205,813 A | | 6/1980 | Evans et al. |
| 4,212,652 A | | 7/1980 | duPont |
| 4,252,286 A | | 2/1981 | Moorehead |
| 4,482,109 A | | 11/1984 | duPont |
| 4,667,909 A | | 5/1987 | Curci |
| 5,002,240 A | | 3/1991 | du Pont |
| 5,002,241 A | | 3/1991 | Tizac |
| 5,226,455 A | | 7/1993 | duPont |
| 5,390,877 A | | 2/1995 | Nightingale |
| 5,454,531 A | | 10/1995 | Melkuti |
| 5,531,402 A | | 7/1996 | Dahl |
| 6,648,268 B2 | * | 11/2003 | duPont ...................... 244/12.5 |

OTHER PUBLICATIONS

Lowe, P., "A New Tilt on Tiltrotors." *Aviation International News,* 32(12):88 (2001).

Wall, R., "Navy, duPont Aerospace To Build High–Speed Combat Transport." *Aviation Week & Space Technology,* 75–76 (1998).

* cited by examiner

CONTROL SYSTEM FOR VERTICAL TAKE OFF AND LAND (VTOL) AIRCRAFT

This application claims priority as a continuation under 35 USC § 120 to U.S. patent application Ser. No. 10/074,710, entitled "CONTROL SYSTEM FOR VERTICAL TAKE OFF AND LAND (VTOL) AIRCRAFT," filed Feb. 13, 2002, now U.S. Pat. No. 6,648,268, which is hereby incorporated by reference in its entirety as if set forth herein.

FIELD OF THE INVENTION

The present invention relates to aeronautics, and more particularly to a control system for a vertical take off and land (VTOL) aircraft, where the pilot may use the same controls to operate the vertical flight and forward flight equipment.

BACKGROUND OF THE INVENTION

In one type of VTOL aircraft, described in U.S. Pat. No. 4,482,109 to the present inventor (the disclosure of which is hereby expressly incorporated by reference), jet engines are provided in a forward portion of the aircraft. During vertical flight, the thrust is directed downwardly via a cascade thrust deflector. During forward flight, the cascade thrust deflector is stored, outside the air stream of the thrust, within the fuselage.

SUMMARY OF THE INVENTION

In one aspect, the present invention provides an integrated pilot control system for an aircraft, such as described above, where the pilot may use the same controls for controlling the aircraft in both vertical and forward flight.

In one aspect, the invention is directed to a jet aircraft comprising a jet engine mounted in a forward portion of the aircraft; a thrust deflection assembly provided rearward of the jet engine, the thrust deflection assembly including a cascade and control box for deflecting thrust during vertical flight of the aircraft, wherein the cascade is movable between a retracted position and deployed positions and whereby manipulation of the cascade and control box controls roll, yaw and pitch of the aircraft during vertical flight ailerons for controlling roll of the aircraft during forward flight; a rudder for controlling yaw of the aircraft during forward flight; elevators for controlling pitch of the aircraft during forward flight; a pilot control input apparatus, which receives pilot input regarding desired roll, yaw and pitch of the aircraft; and a control mixer, operatively associated with the pilot control input apparatus, for controlling the control box, ailerons, rudder and elevators in accordance with the desired roll, yaw and pitch of the aircraft, wherein the pilot uses the same control input apparatus for vertical and forward flight.

In another aspect, the thrust deflection assembly may include at least two control boxes.

In another aspect, the control box may include a plurality of vanes for controlling roll of the aircraft.

In another aspect, the thrust deflection assembly may include a plurality of doors, which cooperate with the cascade to direct thrust to the control box.

In another aspect, the thrust deflection assembly may be mounted for movement such that it may be selectively moved into and out of a thrust from the jet engine.

In another aspect, the control mixer may be mechanically or electronically linked to the pilot control input apparatus.

In another aspect, the control mixer may be electronically linked to the pilot control input apparatus via a wireless or wired link.

In another aspect, the control mixer may be mechanically or electronically linked to the control box.

In another aspect, the control mixer may electronically linked to the control box via a wireless or wired link.

In another aspect, the control mixer may directly control at least one of the (i) control box, (ii) rudder, (iii) elevators, and (iv) ailerons.

In another aspect, the control mixer may indirectly control at least one of the (i) control box, (ii) rudder, (iii) elevators, and (iv) ailerons via a servo motor.

In another aspect, during vertical flight, pitch may be controlled by rotating the control box around an axis perpendicular to a longitudinal axis of the aircraft.

In another aspect, the thrust deflection assembly may include at least two control boxes, and during vertical flight, yaw may be controlled by differentially moving the two control boxes.

In another aspect, the control mixer may further comprise a mechanical converter assembly, which bifurcates input from the pilot control input apparatus and is mechanically link to the control box and at least one of (i) the rudder, (ii) elevators, and (iii) ailerons. Further, the relative ratio of movement between the (i) control box and (ii) the at least one of the rudder, elevators and ailerons, may be adjusted by varying the mechanical converter assembly.

As used herein, "vertical flight" is defined as flight in which the cascade is in a non-retracted, deployed position.

As used herein, "forward flight" is defined as flight in which the cascade is in a retracted position.

Other aspects, objects and advantages will be apparent from the description that follows, including the figures and the claims.

DETAILED DESCRIPTION

Figure 1:
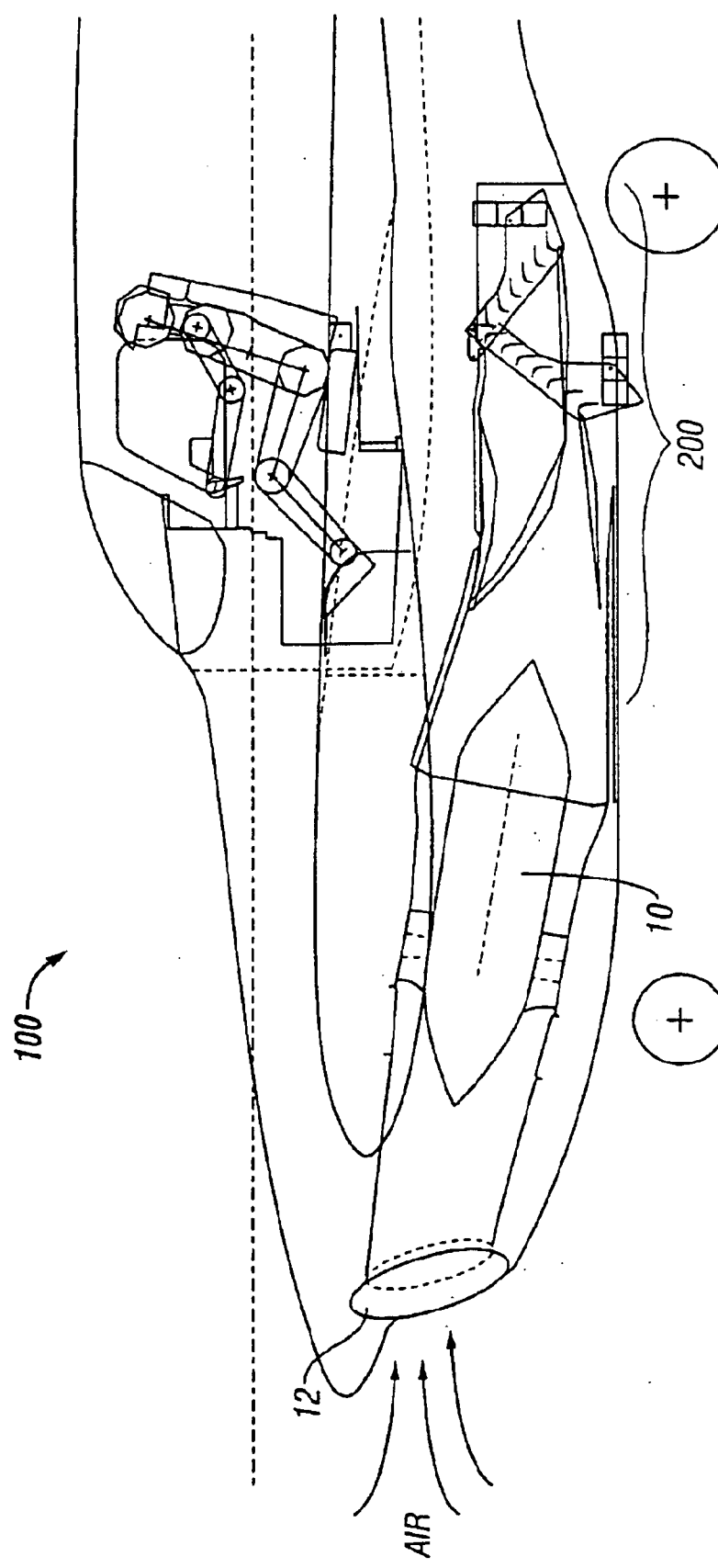
FIG. 1 illustrates a partial cross section of the forward portion of an aircraft employing one embodiment of the invention.

As shown in FIG. 1, an aircraft 100, according to one embodiment of the invention, may have at least one jet engine 10 mounted in its forward portion. The jet engine 10 may draw air from a suction aperture 12 formed in the nose of aircraft 100. The air stream leaving the jet engine 10, referred to herein as the thrust, is directed toward a thrust deflection assembly 200, described in more detail below. In forward flight, the thrust deflection assembly 200 directs the thrust generally parallel to the longitudinal axis of the aircraft. In vertical flight, however, the thrust deflection assembly 200 deflects the thrust downward from the longitudinal axis of the aircraft 100.

Figure 2:
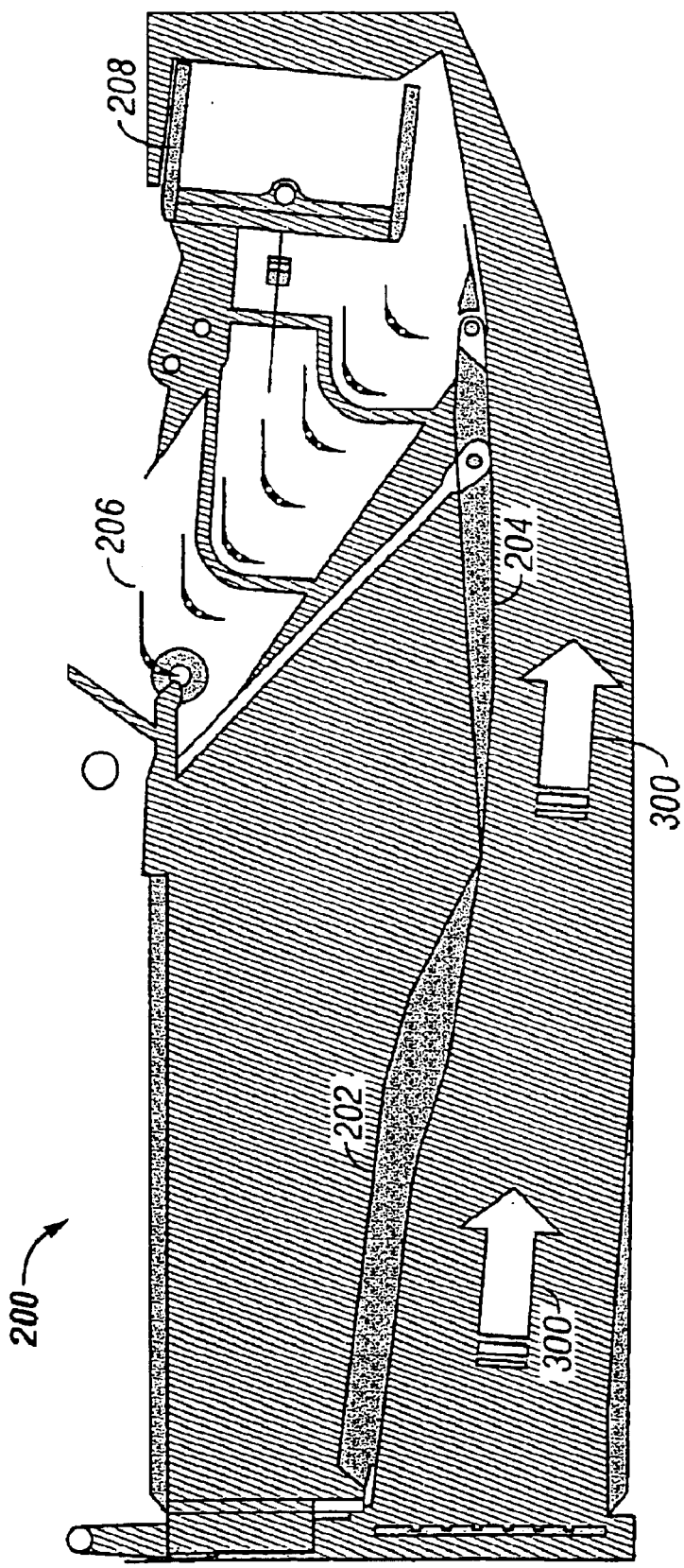
FIG. 2 illustrates a more detailed view of the thrust deflection assembly in a retracted state for forward flight, in accordance with one embodiment of the invention.
Figure 3:
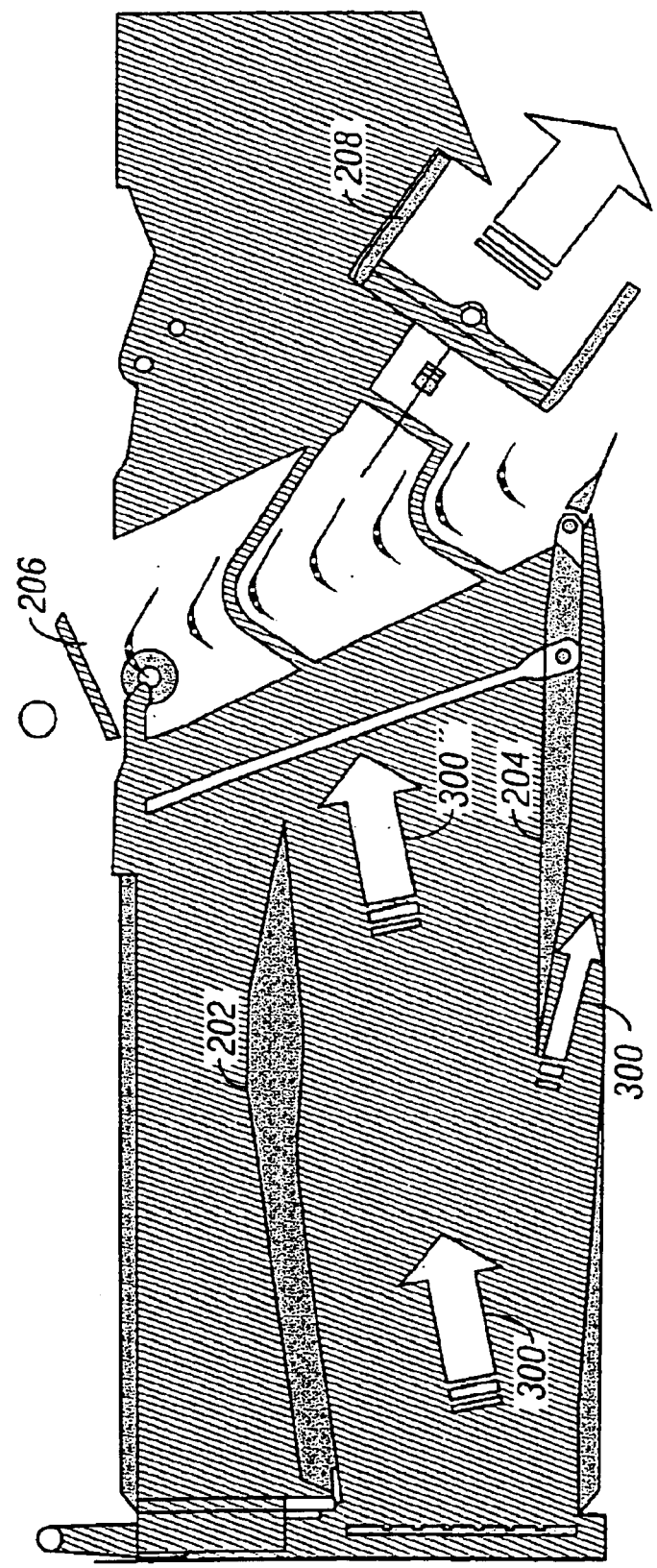
FIG. 3 illustrates a more detailed view of the thrust deflection assembly positioned so as to deflect the thrust at an angle of approximately 35 degrees to the longitudinal axis of the aircraft, in accordance with one embodiment of the invention.

FIG. 2 illustrates a more detailed view of the thrust deflection assembly 200 in a retracted state for forward flight. In one embodiment, the thrust deflection assembly 200 includes a pair of movable doors 202 and 204, a cascade 206 and a control box 208. Thrust 300, exiting jet engine 10 (not shown), is directed so as to bypass the deflection assembly 200 in this figure. The cascade 206 and/or control box 208 are movable between a retracted position and deployed positions (see, e.g., FIGS. 3–6). Any suitable apparatus, such as a mechanical lever or hydraulic actuator, may be used to accomplish this.

Figure 4:
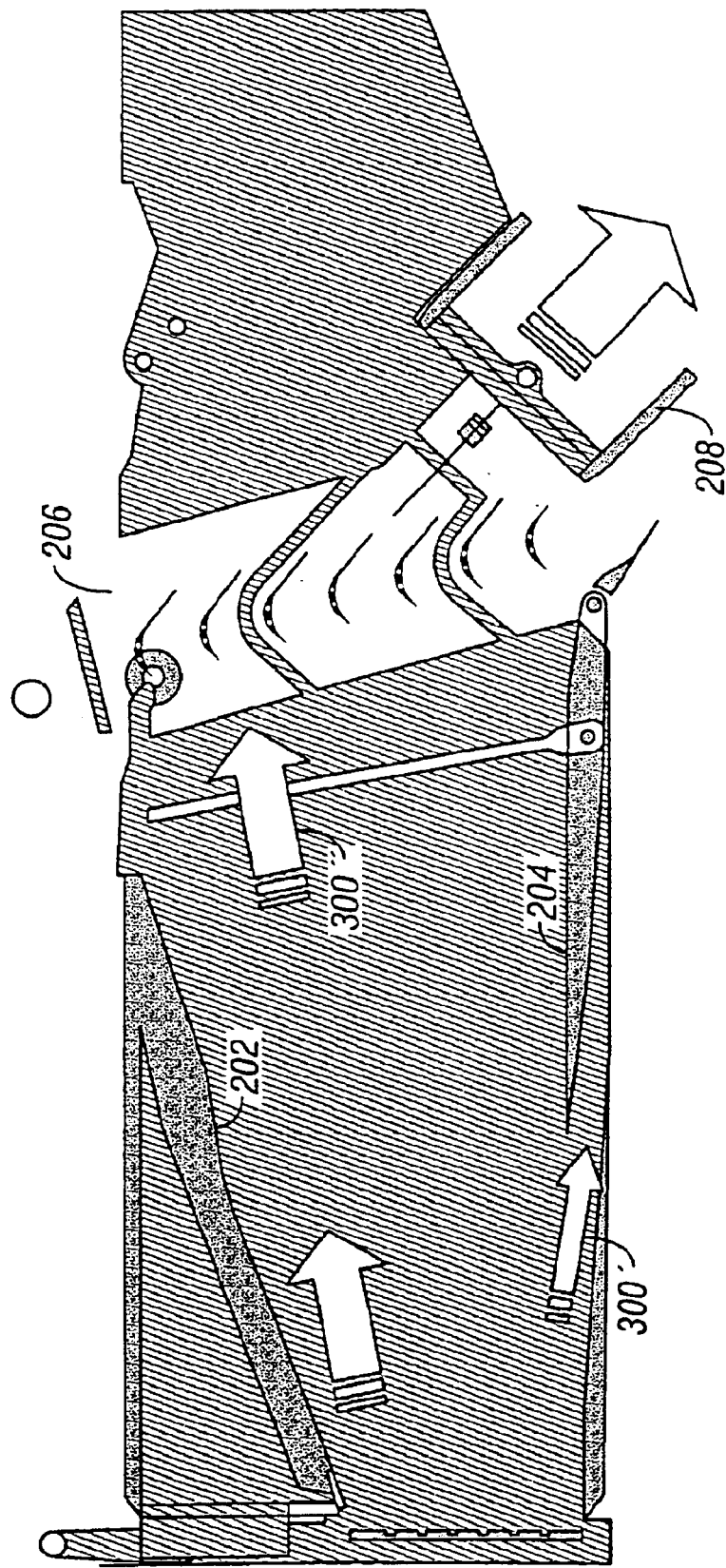
FIG. 4 illustrates a more detailed view of the thrust deflection assembly positioned so as to deflect the thrust at an angle of approximately 45 degrees to the longitudinal axis of the aircraft, in accordance with one embodiment of the invention.
Figure 5:
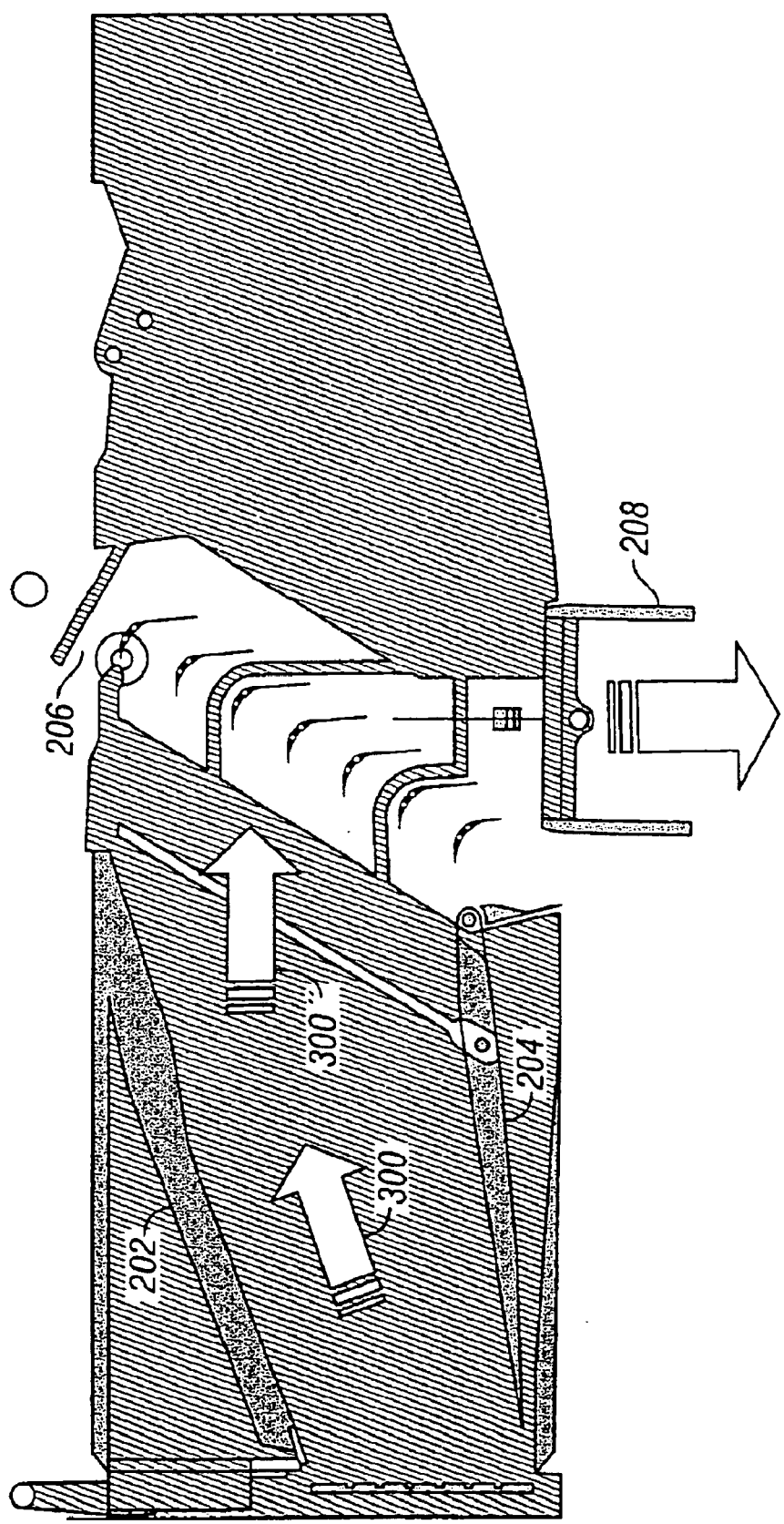
FIG. 5 illustrates a more detailed view of the thrust deflection assembly positioned so as to deflect the thrust at an angle of approximately 90 degrees to the longitudinal axis of the aircraft, in accordance with one embodiment of the invention.
Figure 6:
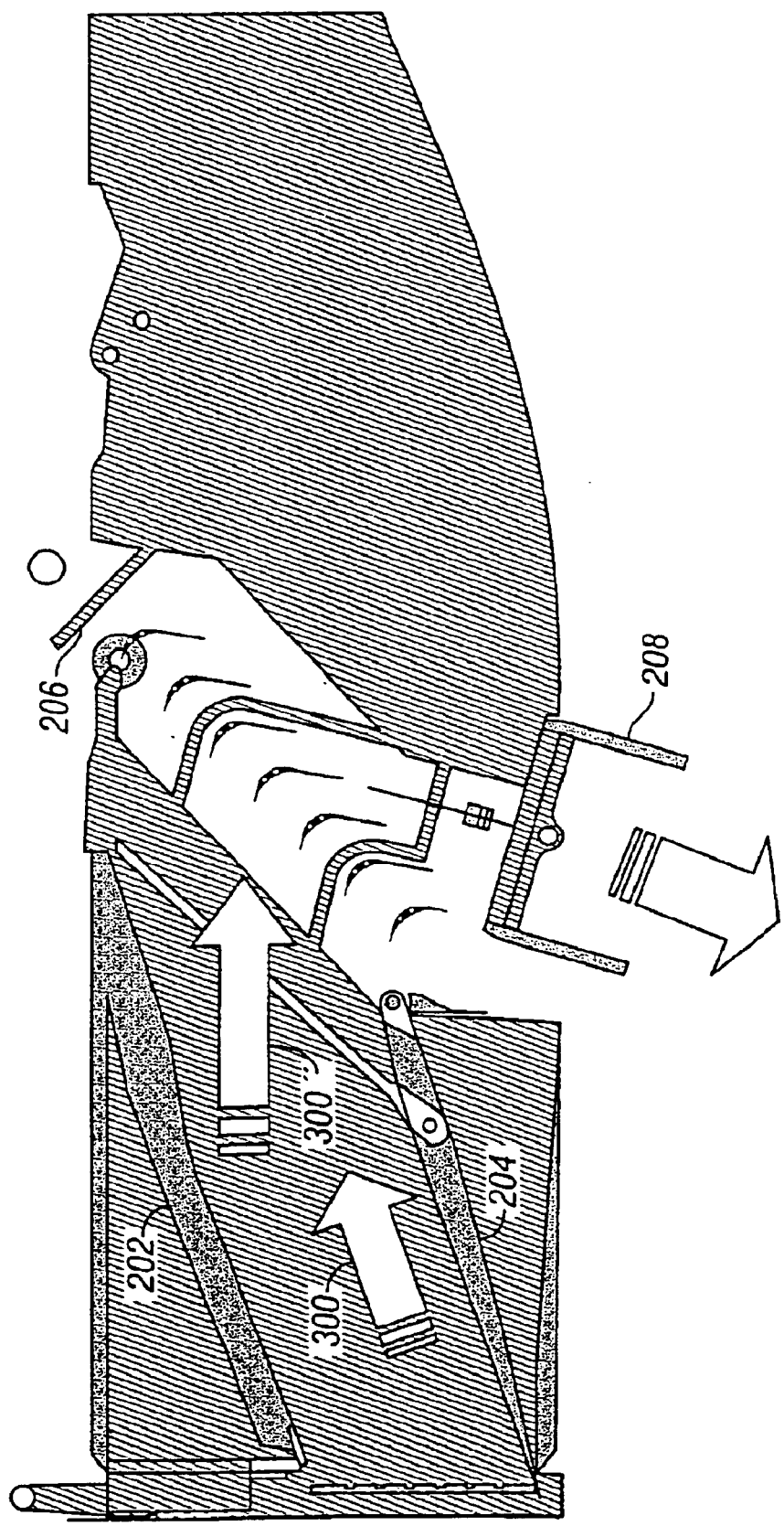
FIG. 6 illustrates a more detailed view of the thrust deflection assembly positioned so as to deflect the thrust at an angle of approximately 105 degrees to the longitudinal axis of the aircraft, in accordance with one embodiment of the invention.

As shown in FIGS. 3–6, in certain types of flight, at least a portion of the thrust 300 is deflected by the thrust deflection assembly 200. For example, in FIG. 3, the thrust is deflected at approximately 35 degrees to the longitudinal axis of the aircraft. To accomplish this, doors 200 and 204 are moved so as to direct a portion 300" of the thrust 300 towards the cascade 206, which deflects the thrust 300" through the control box 208. As explained in more detail below, the control box 208 may be manipulated to control the pitch, yaw and roll of the aircraft in vertical flight. FIGS. 4–6 illustrate the positioning of the thrust deflection assembly 200, where the thrust 300 is deflected at approximately 45, 90 and 105 degrees to the longitudinal axis, respectively. As may be appreciated from these figures, as the deflection angle increases towards 90 degrees the portion 300" of the thrust 300 increases until all or substantially all of the thrust is passed through the thrust deflection assembly 200. For hovering flight, the aircraft 100 may use the arrangement of FIG. 5.

Figure 7:
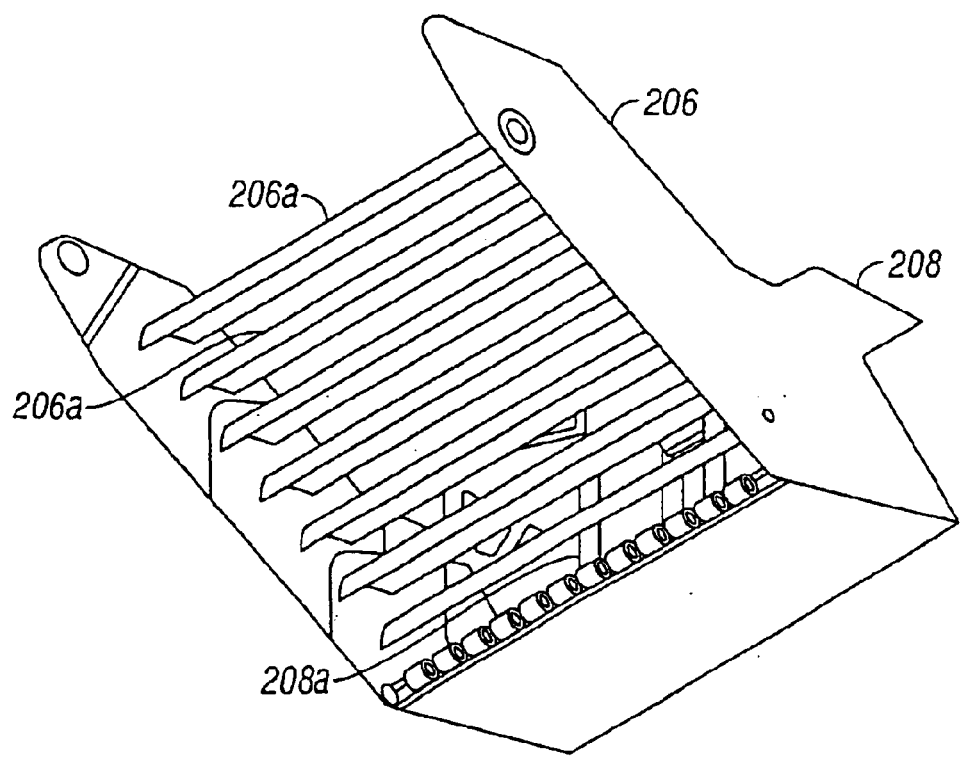
FIG. 7 illustrates a perspective view of the cascade and control box, in accordance with one embodiment of the invention.
Figure 8:
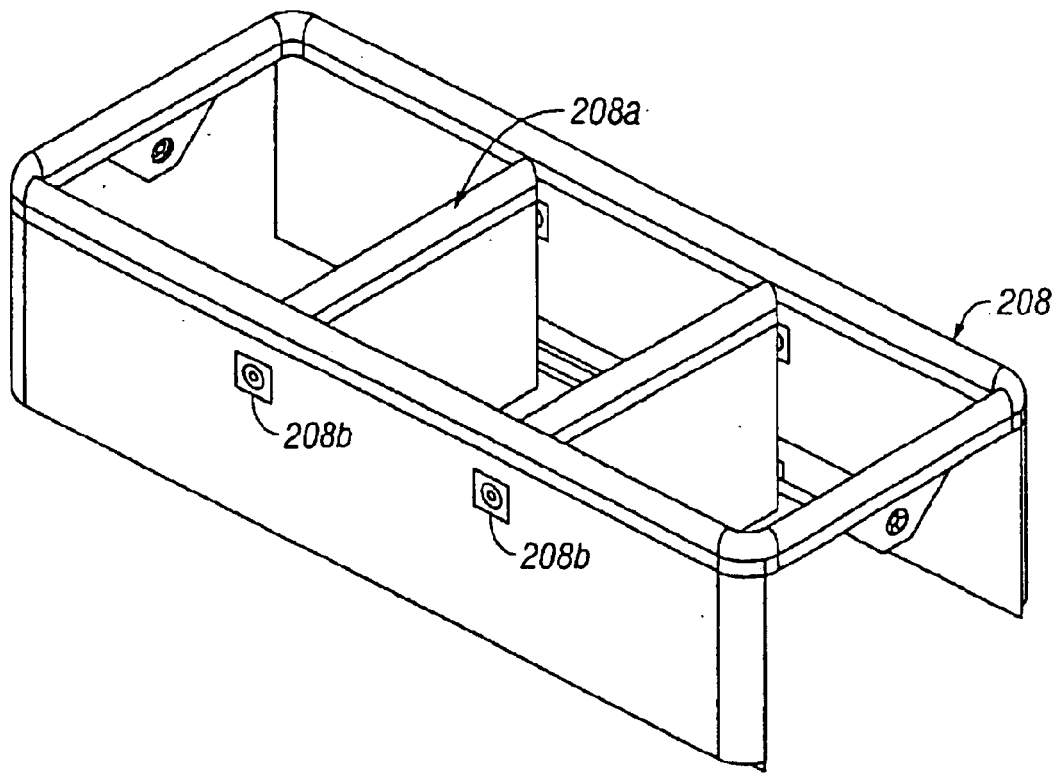
FIG. 8 illustrates a perspective view of a control box, in accordance with one embodiment of the invention.
Figure 9:
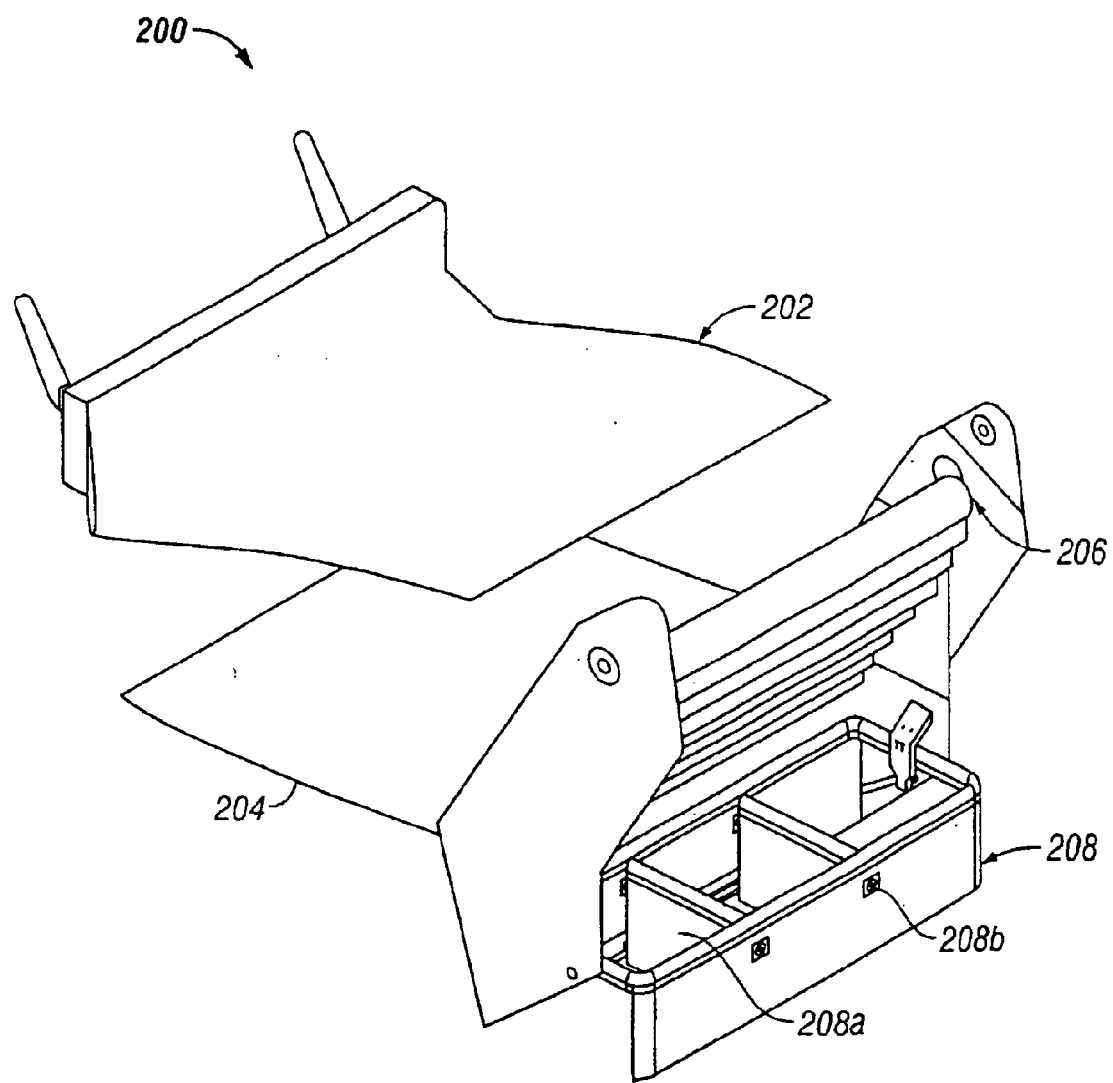
FIG. 9 illustrates a perspective view of the thrust deflection assembly according to one embodiment of the invention.

FIG. 7 illustrates a more detailed view of the cascade 206 and control box 208. As may be seen from this figure, the cascade 206 has a plurality of louvers 206a for directing the flow of thrust 300" therethrough. Moreover, control box 208, attached to the cascade 206, has a plurality of vanes 208a provided therein. As shown in FIG. 8, the vanes 208a may be hinged for movement around pivots 208b. FIG. 9 illustrates a perspective view of the thrust deflection assembly 200 according to one embodiment of the invention.

During forward flight, the pilot may control the pitch, roll and yaw of the aircraft primarily through the conventional control elements (e.g., the rudder, elevators and ailerons). However, as explained in more detail below, during vertical flight the pilot may control the pitch, roll and yaw of the aircraft primarily through the thrust deflection assembly 200.

Figure 10:
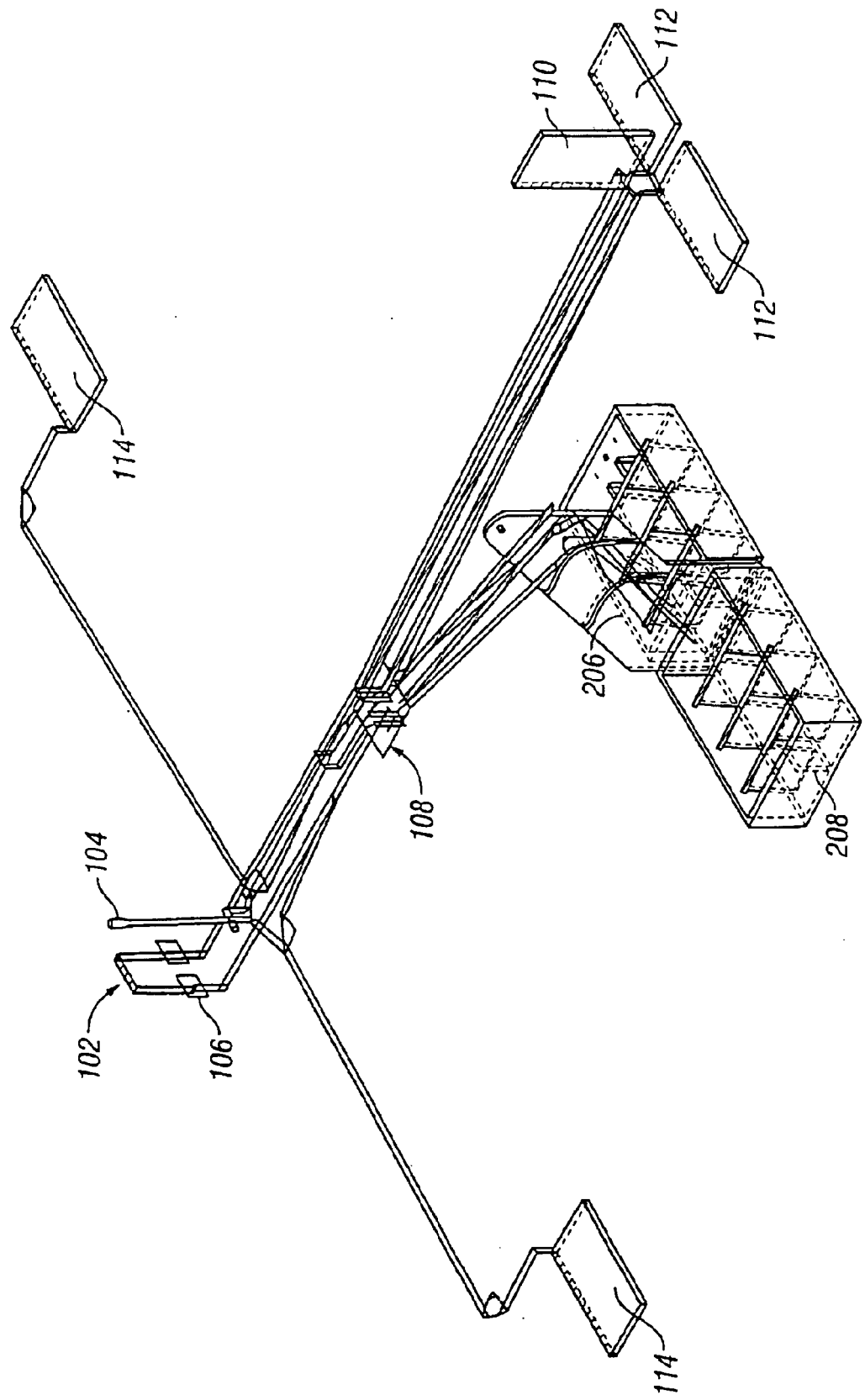
FIG. 10 illustrates a control system for controlling pitch, yaw and roll of an aircraft in accordance with one embodiment of the invention.

Specifically, the control system for the aircraft may be seen in FIG. 10. First, it should be noted that in a preferred embodiment of the invention, two cascades 206 and two control boxes 208 are provided. Preferably, each set is associated with a separate jet engine.

As shown in FIG. 10, a pilot control input apparatus 102 may include conventional pilot input devices such as stick 104 and rudder pedals 106. The pilot control input apparatus 102 may be operatively associated with a control mixer 108 (shown in more detail in FIG. 11). For example, the pilot control input apparatus 102 may be mechanically linked to the control mixer 108. Alternatively, an electronic link (wired or wireless) may be used. The control mixer 108 may be operatively associated with each of the rudder 110, elevators 112, ailerons 114 and control box 208. Again, the link may be mechanical or electronic. In the embodiments shown, a mechanical link is used. Moreover, the control mixer 108 may directly control the rudder 110, elevators 112, ailerons 114, and control box 208 or may control servo motors or other apparatus that in turn directly control any one or all of these items.

Figure 11:
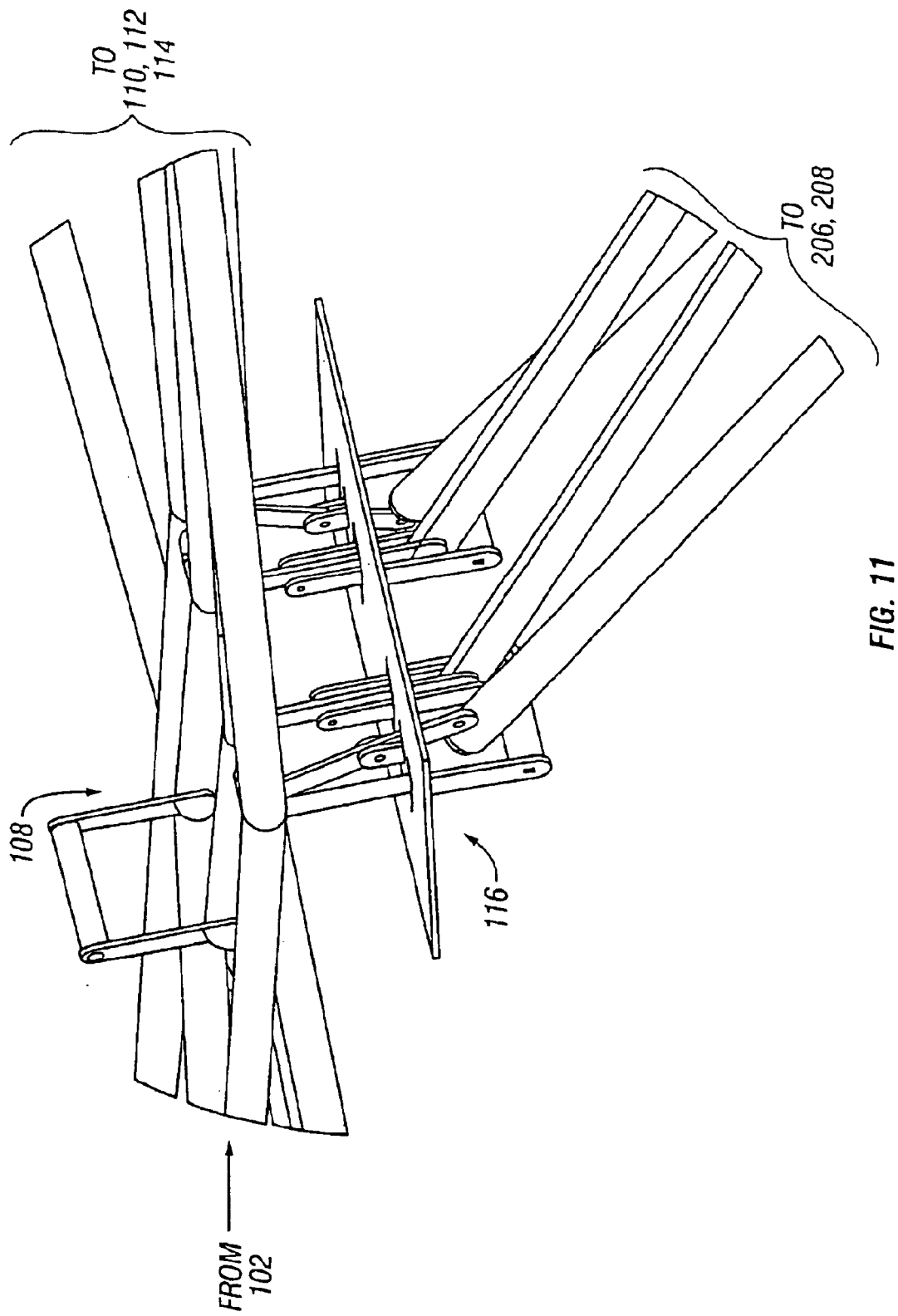
FIG. 11 illustrates a more detailed view of a control mixer, in accordance with one embodiment of the invention.

FIG. 11 shows a more detailed view of one embodiment of the control mixer 108. As illustrated a mechanical converter assembly 116 is used to bifurcate the input from 102 so as to provide controls for the forward flight devices (110, 112 and 114) and the vertical flight devices (208). The relative ratio of movement between the forward flight devices and vertical flight devices may be controlled by setting the pin positions of the links in assembly 116.

The control of the pitch, yaw and roll of the aircraft will now be explained.

Figure 12:
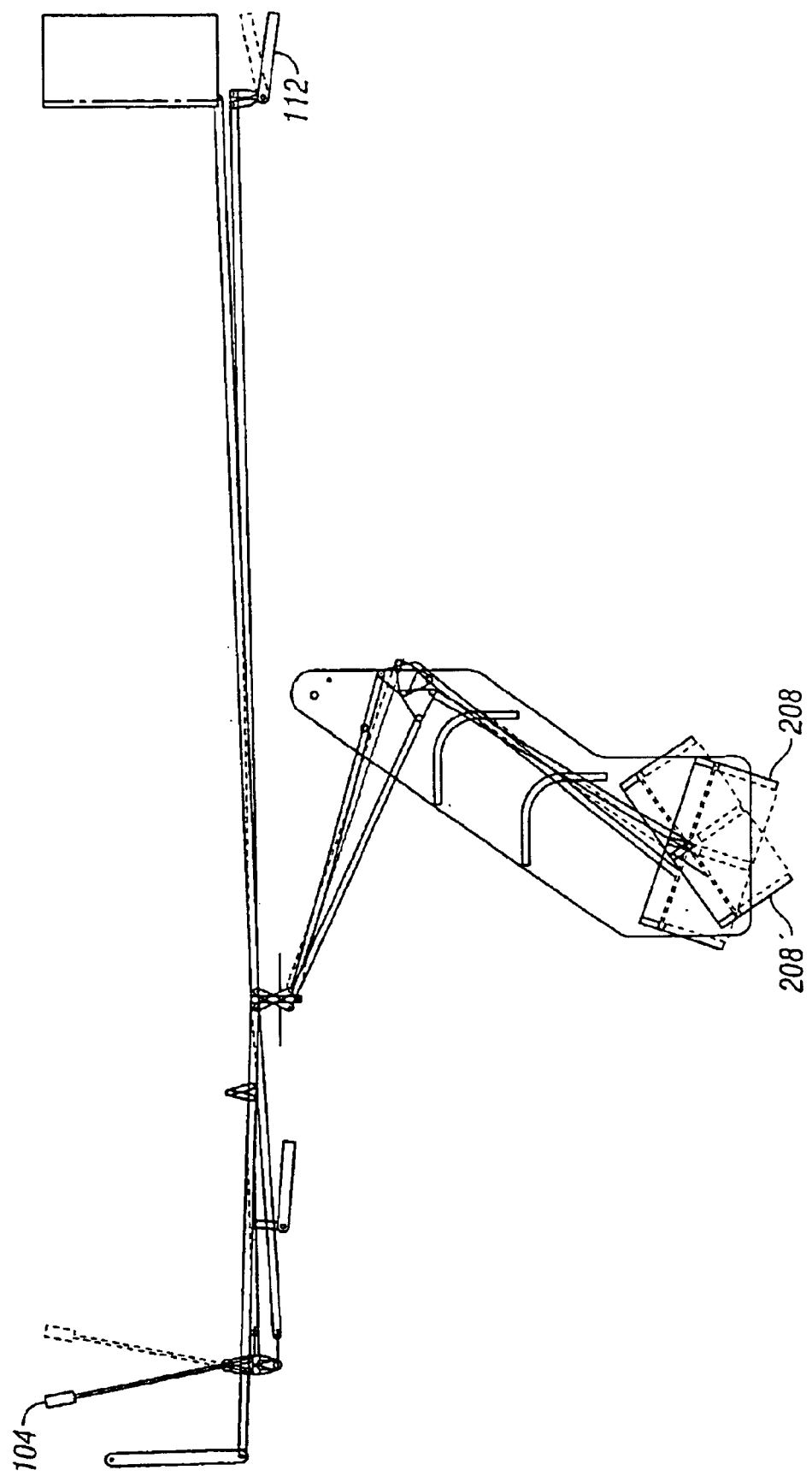
FIG. 12 illustrates a mechanism for controlling pitch, in accordance with one embodiment of the invention.

FIG. 12 illustrates the mechanism for controlling pitch according to one embodiment of the invention. During forward flight, the pitch may be controlled primarily via the elevators 112. In vertical flight, pitch may be controlled by rotating the control box 208 about an axis perpendicular to the longitudinal axis of the aircraft. As shown in FIG. 12, when the control box 208 is rotated into the position shown in 208', the aircraft will pitch up, whereas when the control box 208 is rotated into position 208", the aircraft will pitch down.

Figure 13:
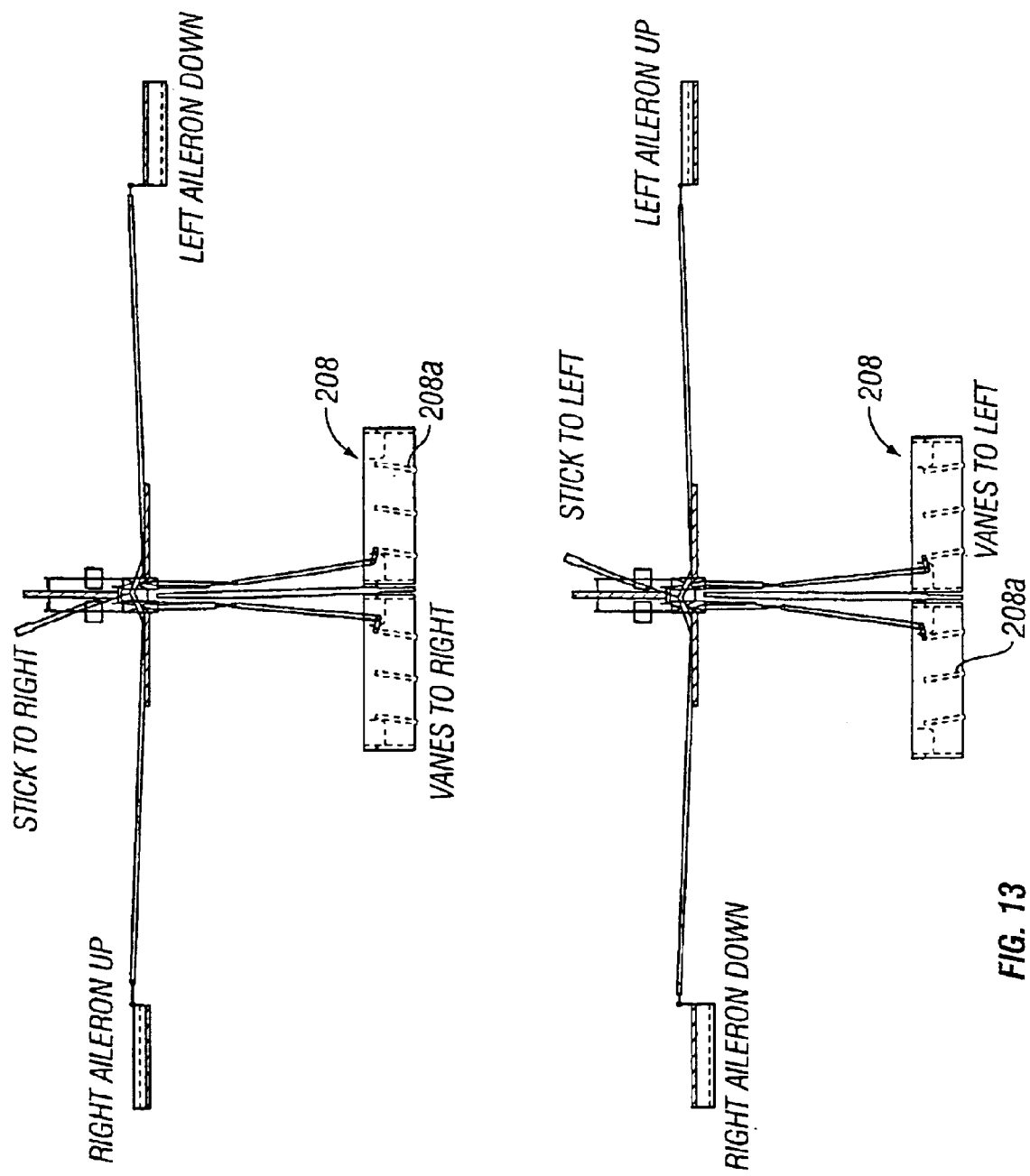
FIG. 13 illustrates a mechanism for controlling roll, in accordance with one embodiment of the invention.

FIG. 13 illustrates the mechanism for controlling roll according to one embodiment of the invention. Right and left are reversed in the figure as it is a bottom view. During forward flight, roll may be controlled primarily via the ailerons 114. In vertical flight, roll may be controlled by rotation of the vanes 208a of control box 208.

Figure 14:
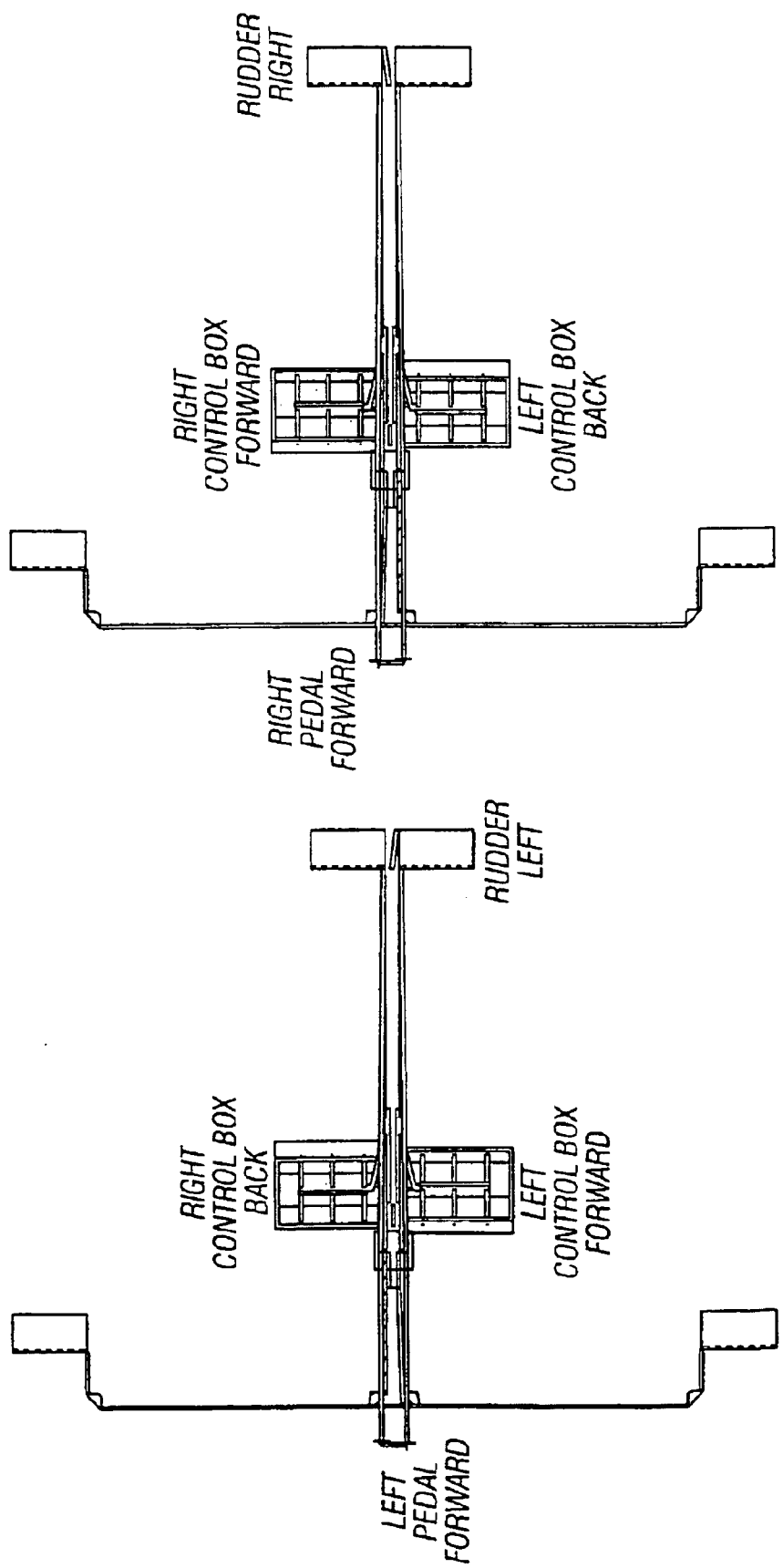
FIG. 14 illustrates a mechanism for controlling yaw, in accordance with one embodiment of the invention.

FIG. 14 illustrates the mechanism for controlling yaw according to one embodiment of the invention. During forward flight, yaw may be controlled primarily via the rudder 116. In vertical flight, yaw may be controlled by differential rotation of the left and right control boxes 208. That is the control boxes 208 are rotated in the manner described above with respect to pitch; however, they are moved in the opposite directions so as to achieve the desired yaw.

It will be understood that the above description has been with respect to particular embodiments of the invention.

While this description is fully capable of attaining the objects of the invention, it is understood that the same is merely representative of the broad scope of the invention envisioned, and that numerous variations of the above embodiments may be known or may become known or are obvious or may become obvious to one of ordinary skill in the art, and these variations are fully within the broad scope of the invention. Accordingly, the scope of the invention is to be limited only by the claims appended hereto, and equivalents thereof. In these claims, a reference to an element in the singular is not intended to mean "one and only one" unless explicitly stated. Rather, the same is intended to mean "one or more". All structural and functional equivalents to the elements of the above-described preferred embodiment that are known or later become known to those of ordinary skill in the art are expressly incorporated herein by reference and are intended to be encompassed by the present claims. Moreover, it is not necessary for an apparatus or method to address any or every problem sought to be solved by the present invention for it to be encompassed by the present claims. Furthermore, no element, component, or method step in the present invention is intended to be dedicated to the public regardless of whether the element, component, or method step is explicitly recited in the claims.

What is claimed is:

1. A jet aircraft comprising:
   a jet engine mounted in a forward portion of the aircraft;
   a thrust deflection assembly provided rearward of the jet engine, the thrust deflection assembly including a cascade and control box for deflecting thrust during vertical flight of the aircraft, wherein the cascade is movable between a retracted position and deployed positions and whereby manipulation of the cascade and control box controls roll, yaw and pitch of the aircraft during vertical flight;
   conventional control elements for controlling roll, yaw and pitch of the aircraft during forward flight;
   a pilot control input apparatus, which receives pilot input regarding desired roll, yaw and pitch of the aircraft; and
   a control mixer, operatively associated with the pilot control input apparatus, for controlling the cascade, control box and conventional control elements in accordance with the desired roll, yaw and pitch of the aircraft,
   wherein the pilot uses the same control input apparatus for vertical and forward flight.

2. The aircraft of claim 1, wherein the thrust deflection assembly includes at least two control boxes.

3. The aircraft of claim 1, wherein the control box includes a plurality of vanes for controlling roll of the aircraft.

4. The aircraft of claim 1, wherein the thrust deflection assembly includes a plurality of doors, which cooperate with the cascade to direct thrust to the control box.

5. The aircraft of claim 1, wherein the thrust deflection assembly is mounted for movement such that it may be selectively moved into and out of a thrust from the jet engine.

6. The aircraft of claim 1, wherein the control mixer is mechanically linked to the pilot control input apparatus.

7. The aircraft of claim 1, wherein the control mixer is electronically linked to the pilot control input apparatus.

8. The aircraft of claim 7, wherein the control mixer is electronically linked to the pilot control input apparatus via a wireless link.

9. The aircraft of claim 7, wherein the control mixer is electronically linked to the pilot control input apparatus via a wired link.

10. The aircraft of claim 1, wherein the control mixer is mechanically linked to the control box.

11. The aircraft of claim 1, wherein the control mixer is electronically linked to the control box.

12. The aircraft of claim 11, wherein the control mixer is electronically linked to the control box via a wireless link.

13. The aircraft of claim 11, wherein the control mixer is electronically linked to the control box via a wired link.

14. The aircraft of claim 1, wherein during vertical flight, pitch is controlled by rotating the control box around an axis perpendicular to a longitudinal axis of the aircraft.

15. The aircraft of claim 1, wherein the thrust deflection assembly includes at least two control boxes, and during vertical flight, yaw is controlled by differentially moving the two control boxes.

16. The aircraft of claim 1, wherein the control mixer further comprises a mechanical converter assembly, which bifurcates input from the pilot control input apparatus and is mechanically linked to the control box.

17. The aircraft of claim 1, wherein the thrust deflection assembly includes at least two control boxes and each control box includes a plurality of vanes for controlling roll of the aircraft.

18. The aircraft of claim 17, wherein the thrust deflection assembly includes a plurality of doors, which cooperate with the cascade to direct thrust to the control box.

19. The aircraft of claim 18, wherein the thrust deflection assembly is mounted for movement such that it may be selectively moved into and out of a thrust from the jet engine.

* * * * *